US012633282B2

(12) United States Patent
Tu et al.

(10) Patent No.: US 12,633,282 B2
(45) Date of Patent: May 19, 2026

(54) PROCESSING METHOD AND PROCESSING APPARATUS OF SOUND SIGNAL

(71) Applicant: Acer Incorporated, New Taipei City (TW)

(72) Inventors: Po-Jen Tu, New Taipei City (TW); Jia-Ren Chang, New Taipei City (TW); Kai-Meng Tzeng, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 135 days.

(21) Appl. No.: 18/594,019

(22) Filed: Mar. 4, 2024

(65) Prior Publication Data

US 2025/0232759 A1 Jul. 17, 2025

(30) Foreign Application Priority Data

Jan. 11, 2024 (TW) ................................. 113101271

(51) Int. Cl.
*G10L 13/02* (2013.01)

(52) U.S. Cl.
CPC .................................... *G10L 13/02* (2013.01)

(58) Field of Classification Search
None
See application file for complete search history.

(56) References Cited

U.S. PATENT DOCUMENTS 7,238,961 B2 * 7/2007 Bernds ................. H10K 10/468
438/82
8,639,502 B1 * 1/2014 Boucheron ............. G10L 21/02
704/226
2018/0301140 A1 * 10/2018 Turcott .................. G06N 3/044
2019/0155386 A1 5/2019 Tadi et al.
2024/0135117 A1 * 4/2024 Rybakov ................. G06F 40/58
2024/0363126 A1 * 10/2024 Okamoto ................ G10L 13/08
2025/0201231 A1 * 6/2025 Chen ..................... G10L 21/003

FOREIGN PATENT DOCUMENTS

| | | |
|---|---|---|
| CN | 107331385 | 11/2017 |
| CN | 111564159 | 8/2020 |
| CN | 111667834 | 9/2020 |
| CN | 115512683 | 12/2022 |
| TW | I557729 | 11/2016 |
| TW | 202343476 | 11/2023 |

* cited by examiner

*Primary Examiner* — Jakieda R Jackson
(74) *Attorney, Agent, or Firm* — JCIPRNET

(57) ABSTRACT

A processing method and a processing apparatus of sound signal are provided. Extracting a plurality of mel-frequency cepstrum coefficients (MFCCs) from a sound signal to be processed includes: obtaining a power corresponding to a plurality of mel-frequencies of the sound signal to be processed through a plurality of band-pass filters, in which each band-pass filter corresponds to a mel frequency, and the mel-frequencies corresponding to the band-pass filters are different; mapping a first frequency among the mel-frequencies to a second frequency among the mel-frequencies, and replacing the power corresponding to the second frequency with the power corresponding to the first frequency, in which the second frequency is lower than the first frequency; and generating the MFCCs using the power corresponding to the mel-frequencies. A synthetic sound signal is generated using the MFCCs of the sound signal to be processed. Therefore, a complete sound feature is retained.

12 Claims, 6 Drawing Sheets

PROCESSING METHOD AND PROCESSING APPARATUS OF SOUND SIGNAL

CROSS-REFERENCE TO RELATED APPLICATION

This application claims the priority benefit of Taiwan application serial no. 113101271, filed on Jan. 11, 2024. The entirety of the above-mentioned patent application is hereby incorporated by reference herein and made a part of this specification.

BACKGROUND

Technical Field

The disclosure relates to a sound signal processing technology, and particularly relates to a processing method and a processing apparatus of a sound signal.

Description of Related Art

Most hearing-impaired people cannot clearly receive certain high-frequency sound signals, but they can clearly hear low-frequency sound signals. If only an equalizer is used to amplify the high-frequency speech signals in order to improve the aforementioned problems, many unpleasant sounds may occur (for example, roaring, noise amplification, excessive ear pressure, etc.).

Research points out that if high-frequency breath sounds in speech (for example, “s” tudy) are transferred to specific low-frequency signals (for example, “z” tudy), listeners can distinguish their semantic meaning based on experience and learning. The high-frequency breath sounds in normal speech are about 6 kilohertz (kHz). Depending on the condition of ear damage of the hearing-impaired person, the high-frequency breath sounds can be down-converted by one-half or one-quarter to generate a sound signal corresponding to 3 KHz or 1.5 KHz.

SUMMARY

The disclosure provides a processing method and a processing apparatus of a sound signal, which can provide a frequency shift effect of the sound signal.

A processing method of a sound signal according to an embodiment of the disclosure includes (but is not limited to) the following steps. A plurality of mel-frequency cepstrum coefficients (MFCCs) are extracted from a sound signal to be processed, which includes the following. A power corresponding to a plurality of mel-frequencies of the sound signal to be processed is obtained through a plurality of band-pass filters, in which each band-pass filter corresponds to a mel frequency, and the mel-frequencies corresponding to the band-pass filters are different. A first frequency among the mel-frequencies is mapped to a second frequency among the mel-frequencies, and the power corresponding to the second frequency is replaced with the power corresponding to the first frequency, in which the second frequency is lower than the first frequency. The power corresponding to the mel-frequencies is used to generate the mel-frequency cepstrum coefficients. A synthesized sound signal is generated using the mel-frequency cepstrum coefficients of the sound signal to be processed, in which the sound signal to be processed and the synthesized sound signal are configured to be played by a speaker.

A processing apparatus of a sound signal according to an embodiment of the disclosure includes a storage and a processor. The storage is configured to store a program code. The processor is coupled to the storage. The processor is configured to load the program code to: extract a plurality of mel-frequency cepstrum coefficients from a sound signal to be processed, and generate a synthesized sound signal using the mel-frequency cepstrum coefficients of the sound signal to be processed, in which the sound signal to be processed and the synthesized sound signal are configured to be played by a speaker. The processor is configured to: obtain a power corresponding to a plurality of mel-frequencies of the sound signal to be processed through a plurality of band-pass filters, in which each band-pass filter corresponds to a mel frequency, and the mel-frequencies corresponding to the band-pass filters are different; map a first frequency among the mel-frequencies to a second frequency among the mel-frequencies, and replace the power corresponding to the second frequency with the power corresponding to the first frequency, in which the second frequency is lower than the first frequency; and use the power corresponding to the mel-frequencies to generate the mel-frequency cepstrum coefficients.

Based on the above, the processing method and the processing apparatus of the sound signal according to the embodiment of the disclosure can replace the power of the lower mel frequency band with the power of the higher mel frequency, and thereby generate the frequency-shifted mel-frequency cepstrum coefficients and the corresponding synthetic sound signal. The synthesized sound signal can be used on the hearing impaired for listening and can retain the sound features.

In order to make the above-mentioned features and advantages of the disclosure clearer and easier to understand, the following embodiments are given and described in details with accompanying drawings as follows.

DESCRIPTION OF THE EMBODIMENTS

Figure 1:
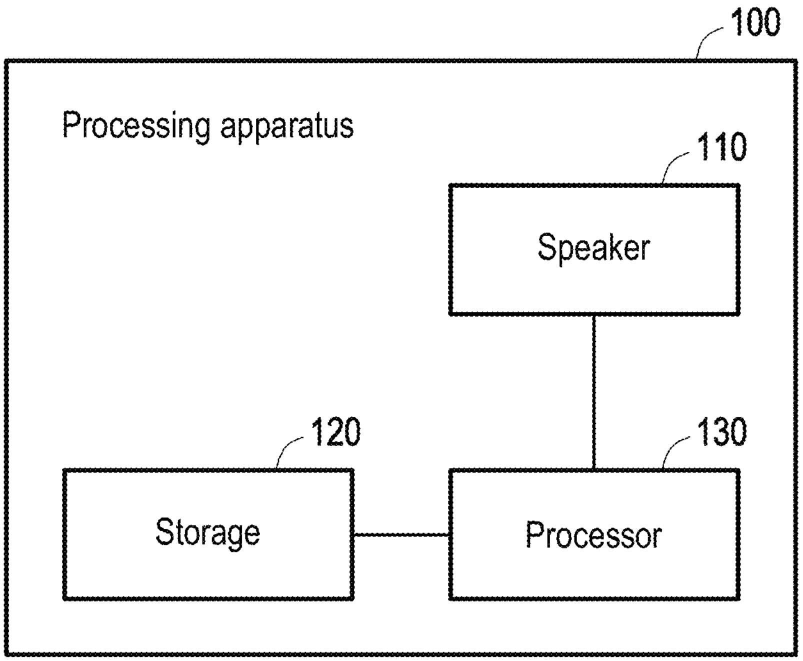
FIG. 1 is a component block diagram of a processing apparatus of a sound signal according to an embodiment of the disclosure.

FIG. 1 is a component block diagram of a processing apparatus 100 of a sound signal according to an embodiment of the disclosure. Referring to FIG. 1, the processing apparatus 100 includes (but is not limited to) a speaker 110 (optional), a storage 120, and a processor 130. The processing apparatus 100 may be a smartphone, a tablet computer, an intelligent assistant device, a wearable device, a vehicle-mounted system, a notebook computer, a hearing aid, a conference call device, or other electronic devices.

The speaker 110 can convert electronic sound signals into sound transducers and electronic components. One or more speakers 110 may also form an audio system group. In an embodiment, the speaker 110 is configured to play sound signals.

The storage 120 can be any form of fixed or movable random access memory (RAM), a read only memory (ROM), a flash memory, a hard disk drive (HDD), solid-state drive (SSD), or a similar element. In an embodiment, the storage 120 is configured to store program codes, software modules, configurations, data (e.g., sound signals, coefficients, algorithm parameters, etc.), or files, and the embodiment thereof will be described in details later.

The processor 130 is coupled to the speaker 110 and the storage 120. The processor 130 may be a central processing unit (CPU), a graphic processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar elements, or a combination thereof. In an embodiment, the processor 130 is configured to execute all or part of the operations of the processing apparatus 100 and can load and execute each program code, software module, file, and data stored in the storage 120. In some embodiments, the functions of the processor 130 may be implemented through software or a chip.

In the following, the method described in the embodiment of the disclosure will be described with reference to each component and module in the processing apparatus 100. Each process of the method can be adjusted according to the implementation situation and is not limited thereto.

Figure 2:
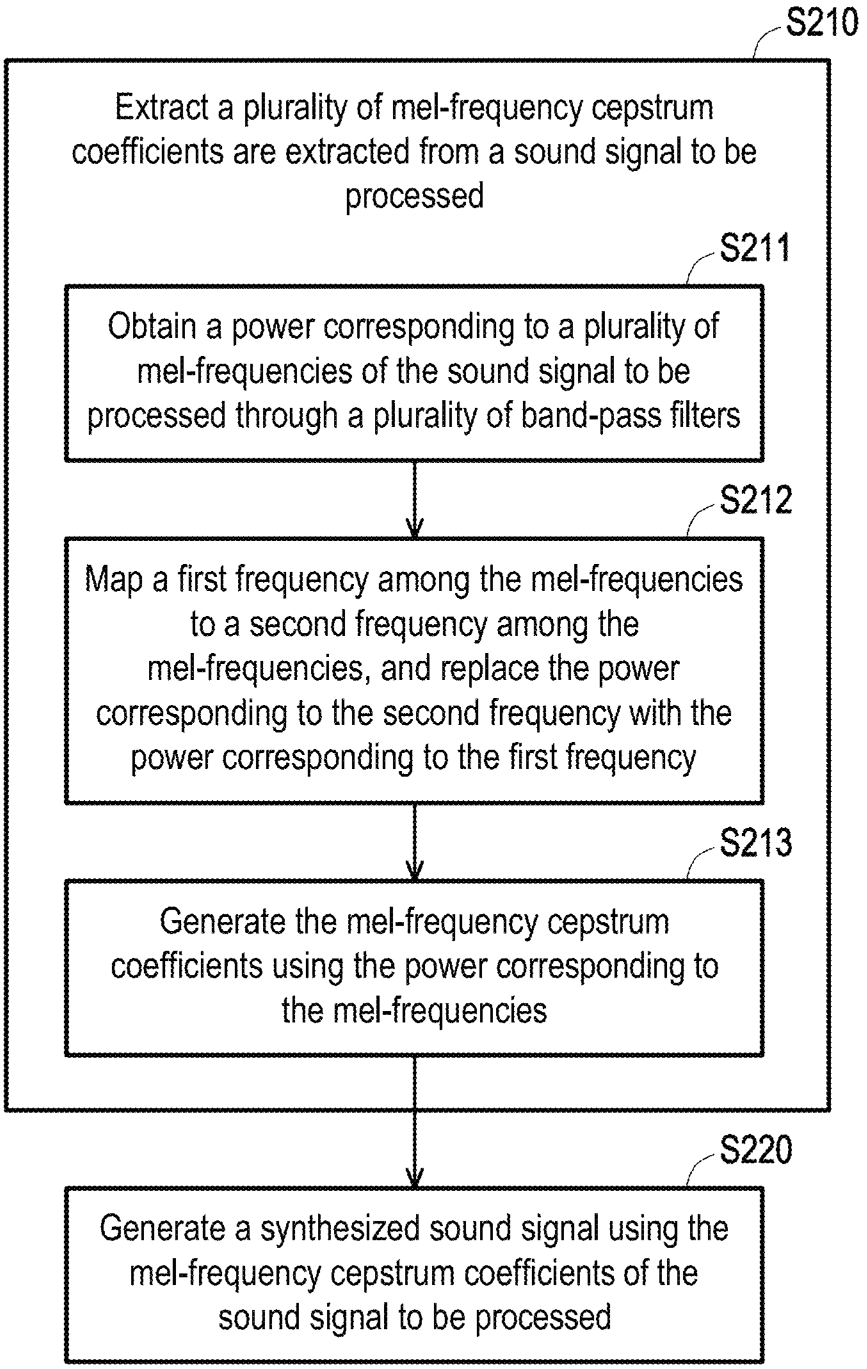
FIG. 2 is a flowchart of a processing method of a sound signal according to an embodiment of the disclosure.

FIG. 2 is a flowchart of a processing method of a sound signal according to an embodiment of the disclosure. Referring to FIG. 2, the processor 130 extracts a plurality of mel-frequency cepstrum coefficients (MFCCs) from a sound signal to be processed (step S210). Specifically, the sound signal to be processed may be a speech signal obtained by recording, receiving, or synthesizing. For example, the speech signal generated by recording a human voice through a microphone; the speech signal transmitted by the conference/call server received through the communication transceiver circuit; or the speech signal edited by audio software. In an embodiment, the sound signal to be processed is the speech signal obtained in application scenarios such as phone calls, video conferencing, dialogues, video viewing, and music playback. In other application scenarios, the sound signal to be processed is not limited to the speech signal.

In an embodiment, the sound signal to be processed may belong to or only include a signal in a specific frequency band. For example, the frequency band corresponding to breath sounds in speech is 4 kilohertz (kHz) to 8 kHz. However, the frequency band corresponding to the sound signal to be processed may still be adjusted according to the actual application scenario.

In an embodiment, the sound signal to be processed is a signal generated by noise suppression, gain amplification, filtering, sound source acquisition, or other sound signal processing.

In an embodiment, the sound signal to be processed is configured to be played by the speaker 110. That is, the speaker 110 can play the sound signal to be processed.

On the other hand, the mel-frequency cepstrum coefficients are coefficients constituting the mel-frequency cepstrum. The mel-frequency cepstrum is formed by the cepstrum of the audio segment, and the frequency bands thereof are divided according to the mel scale (each frequency band corresponds to a mel frequency). An approximate mathematical conversion can be made between the mel scale and the linear frequency scale hertz (Hz). For example, the formula to convert x Hertz to y mel (frequency) is:

$$y = 2595\log_{10}(1 + x/700). \quad (1)$$

One of the characteristics of mel-frequency cepstrum coefficients is the sound features that are close to the hearing features of the human ear. For example, the mel scale represents the human ear's perception of equidistant changes in pitch. Therefore, in some application scenarios, the mel-frequency cepstrum coefficients can be applied to the speech recognition function, but is not limited thereto.

Figure 3:
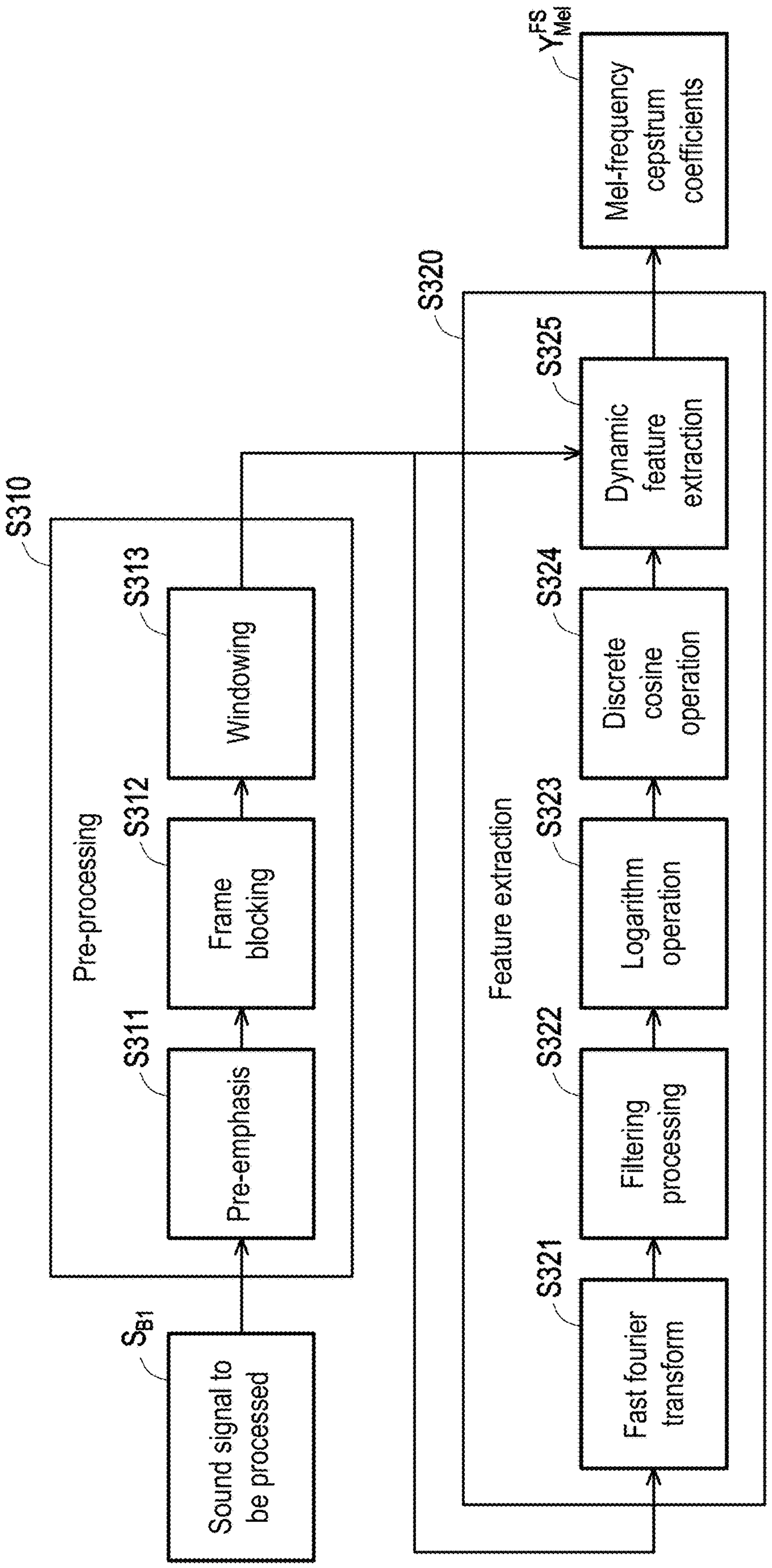
FIG. 3 is a flowchart of a method for generating a mel-frequency cepstrum coefficient according to an embodiment of the disclosure.

FIG. 3 is a flowchart of a method for generating a mel-frequency cepstrum coefficient according to an embodiment of the disclosure. Referring to FIG. 3, the processor 130 performs pre-processing on a sound signal to be processed $S_{B1}$ (step S310).

Specifically, in pre-emphasis (step S311), the processor 130 passes the sound signal to be processed $S_{B1}$ through a high-pass filter ($S_{B1}$(n)−a·$S_{B1}$(n), where a is a coefficient from 0.9 to 1) to eliminate the effects caused by the vocal cords and lips during phonation, and compensate for the high-frequency part of the speech signal that is suppressed by the pronunciation system.

In frame blocking (step S312), a set of i sampling points is defined as a frame, and the processor 130 can divide a frame for each i sampling point of the sound signal to be processed $S_{B1}$, and then obtain a plurality of frames (or sound frames).

In windowing (step S313), the processor 130 multiplies each frame of the sound signal to be processed $S_{B1}$ by a hamming window to increase the continuity of the left end and right end of the frame.

Next, the processor 130 extracts the mel-frequency cepstrum coefficients (step S320) of the preprocessed (step S310) sound signal to be processed $S_{B1}$.

Specifically, in fast fourier transform (FFT) (step S321), the processor 130 converts each frame of the sound signal to be processed $S_{B1}$ from the time domain into the frequency domain to obtain the energy distribution of each frame on the frequency spectrum (e.g., power or energy on the frequency spectrum). In another embodiment, a discrete fourier transform or other time domain to frequency domain transform may be used.

In the filtering processing (step S322), the processor 130 filters the spectral energy obtained in step S321 through a plurality of (triangular or cosine window) band-pass filters to obtain the mel scale energy spectrum. Each band-pass filter corresponds to a mel frequency in units of the mel scale, and the mel-frequencies corresponding to the band-pass filters are different. Therefore, the mel scale energy spectrum represents the power/energy corresponding to a plurality of mel-frequencies.

Figure 4:
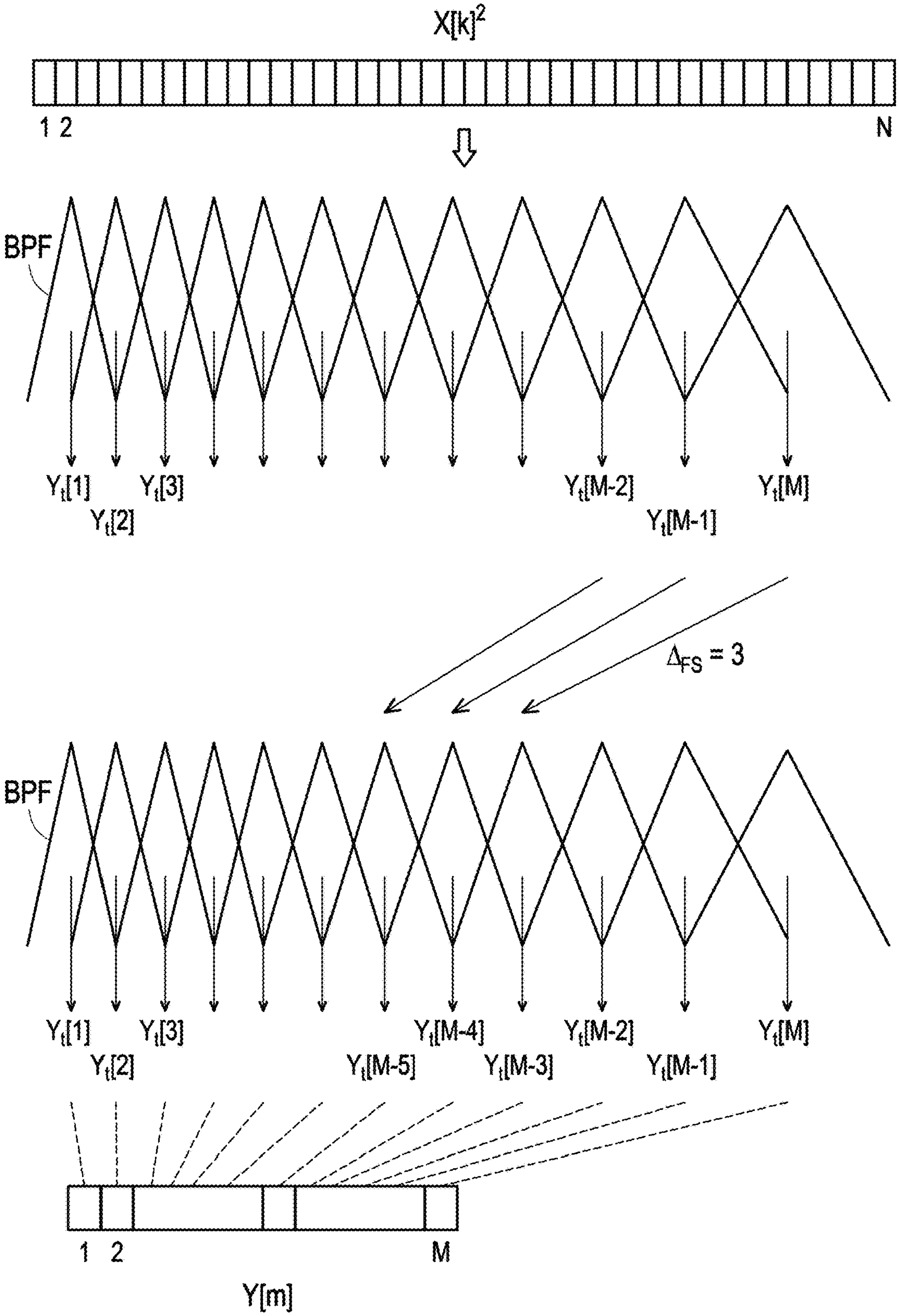
FIG. 4 is a schematic diagram of a mel frequency mapping according to an embodiment of the disclosure.

For example, FIG. 4 is a schematic diagram of a mel-frequency mapping according to an embodiment of the disclosure. Referring to FIG. 4, $|X[k]|^2$ is the power on the frequency spectrum obtained through step S321. k is the identification number (for example, bin number) of the frequency unit (bin) used in fast/discrete fourier transform, and k=1~N (where N is a positive integer). Y[m] is the mel scale energy spectrum. m is the identification number (for example, bank number) of the bank unit of a band-pass filter BPF (for example, a mel filter), and m=1~M (where M is a positive integer). Each bank corresponds to a band-pass filter BPF and also corresponds to a mel-frequency. The band-pass filters BPF correspond to different mel-frequencies.

The formula for energy spectrum transform is:

$$Y_t[m] = \sum_{k=1}^{N} W[k] \cdot |X[k]|^2, \quad (2)$$

where W[k] is the weight of the band-pass filter BPF. $Y_t[m]$ is the power of the bank number m corresponding to the mel-frequency on the mel scale energy spectrum. The power Y[m] is one of $Y_t[1]$ to $Y_t[M]$.

In the logarithm operation (step S323), the processor 130 takes the logarithm of the power at each mel-frequency of the mel scale energy spectrum to obtain the log energy or power of the logarithm.

In the discrete cosine operation (step S324), the processor 130 brings the log energy corresponding to the plurality of mel-frequencies into a discrete cosine transform (DCT) to obtain an L-order mel scale cepstrum coefficient, and L is, for example, 12 (but is not limited thereto).

In dynamic feature extraction (step S325), the processor 130 superimposes the frame energy obtained by the pre-processing in step S310 with the cepstrum coefficient obtained by the discrete cosine operation to obtain the mel-frequency cepstrum coefficient $$Y_{Mel}^{FS}.$$

Referring to FIG. 2, the processor 130 obtains the power corresponding to the plurality of mel-frequencies of the sound signal to be processed through a plurality of band-pass filters (step S211). Specifically, as described in step S322 of FIG. 3 and the description of FIG. 4, the power corresponding to each mel-frequency is the power of the sound signal to be processed on the frequency spectrum transformed into the power corresponding to the mel-frequency in units of the mel scale through the corresponding band-pass filter thereof (such as the band-pass filter BPF of FIG. 4).

The processor 130 maps a first frequency among the plurality of mel-frequencies to a second frequency among the mel-frequencies and replaces the power corresponding to the second frequency with the power corresponding to the first frequency (step S212). Specifically, the second frequency is lower than the first frequency. That is, the first frequency is mapped to a lower second frequency. The power of the second frequency will change directly to the power of the first frequency. Similarly, other frequencies among the mel-frequencies (for example, a third frequency different from the first frequency) can also be mapped to a lower frequency (for example, a fourth frequency different from the second frequency), and accordingly, the power of a lower frequency may directly be replaced by the power of a higher frequency. The above "frequency mapping" and "power replacement" will be collectively referred to as "frequency shift" in the context.

In an embodiment, the processor 130 may displace the first frequency to the second frequency according to the displacement amount. The unit of the displacement amount corresponds to the mel scale. Taking FIG. 4 as an example, the bank numbers (m) are 1 to M. The higher the bank number, the higher the frequency; the lower the bank number, the lower the frequency. The bank number corresponding to the first frequency is greater than the bank number corresponding to the second frequency. The formula for frequency shift is:

$$Y_{FS}[j] = \begin{cases} Y_t[j],\ f < F1 \\ Y_t[j+\Delta_{FS}],\ F1 \le f \le F2\ , \\ 0\ or\ Y_t[j],\ f > F2 \end{cases} \quad (3)$$

where $Y_{FS}[j]$ is the frequency-shifted power of the mel-frequency with the bank number j, $Y_t[j]$ is the power of the bank number j corresponding to the mel-frequency (as shown in formula (2)), $\Delta_{FS}$ is the displacement amount, f is the frequency (in units of Hertz) transformed by formula (1) from the mel-frequency with the bank number j, and F1 and F2 are the lower limit and upper limit of the target frequency band respectively. The target frequency band refers to the frequency band to which frequency shift is desired, for example, 2 kHz (corresponding to F1) to 4 kHz (corresponding to F2) corresponding to high-frequency breath sounds in speech, but is not limited thereto. That is to say, frequency shift is performed on the power corresponding to the bank number of the target frequency band. For frequencies less than or equal to the target frequency band, the power corresponding to the bank number remains unchanged (i.e., not frequency-shifted), and for frequencies more than or equal to the target frequency band, the power corresponding to the bank number remains unchanged (i.e., not frequency-shifted) or is reset to zero (i.e., filtered out).

For example, the displacement $\Delta_{FS}$ is 3. Assuming that the first frequency is located in the target frequency band, and the bank number corresponding to the first frequency is M, then the bank number corresponding to the second frequency is M−3. Therefore, $Y_{FS}$[M−3]=Yt[(M−3)+3]=Yt [M].

Similarly, the processor 130 may displace the third frequency among the plurality of mel-frequencies to the fourth frequency among the mel-frequencies according to the (same) displacement amount, and the fourth frequency is lower than the third frequency. For example, assuming that the bank number corresponding to the third frequency is M−1, then the bank number corresponding to the fourth frequency is M−4. Therefore, $Y_{FS}$[M−4]=Yt[(M−4)+3]=Yt [M−1].

In another embodiment, the displacement amounts of the plurality of mel-frequencies may be different. For example, the displacement amount of the first frequency is 3, and the displacement amount of the third frequency is 4, but is not limited thereto.

Referring to FIG. 2, the processor 130 generates a plurality of mel-frequency cepstrum coefficients using the power corresponding to the plurality of mel-frequencies (step S213). Specifically, as described in steps S323 to S325 of FIG. 3, the power corresponding to the frequency-shifted mel-frequency is subjected to logarithmic operation, discrete cosine operation, and dynamic feature extraction to generate the mel-frequency cepstrum coefficients $$Y_{Mel}^{FS}.$$

Next, the processor 130 generates a synthesized sound signal using the plurality of mel-frequency cepstrum coefficients of the sound signal to be processed (step S220). Specifically, mel-frequency cepstrum coefficients are a type of sound feature. The processor 130 can synthesize the sound signal according to the sound feature.

In an embodiment, the processor 130 may output the synthesized sound signal by inputting the plurality of mel-frequency cepstrum coefficients of the sound signal to be processed to a mel generative adversarial network (Mel-GAN).

Figure 5:
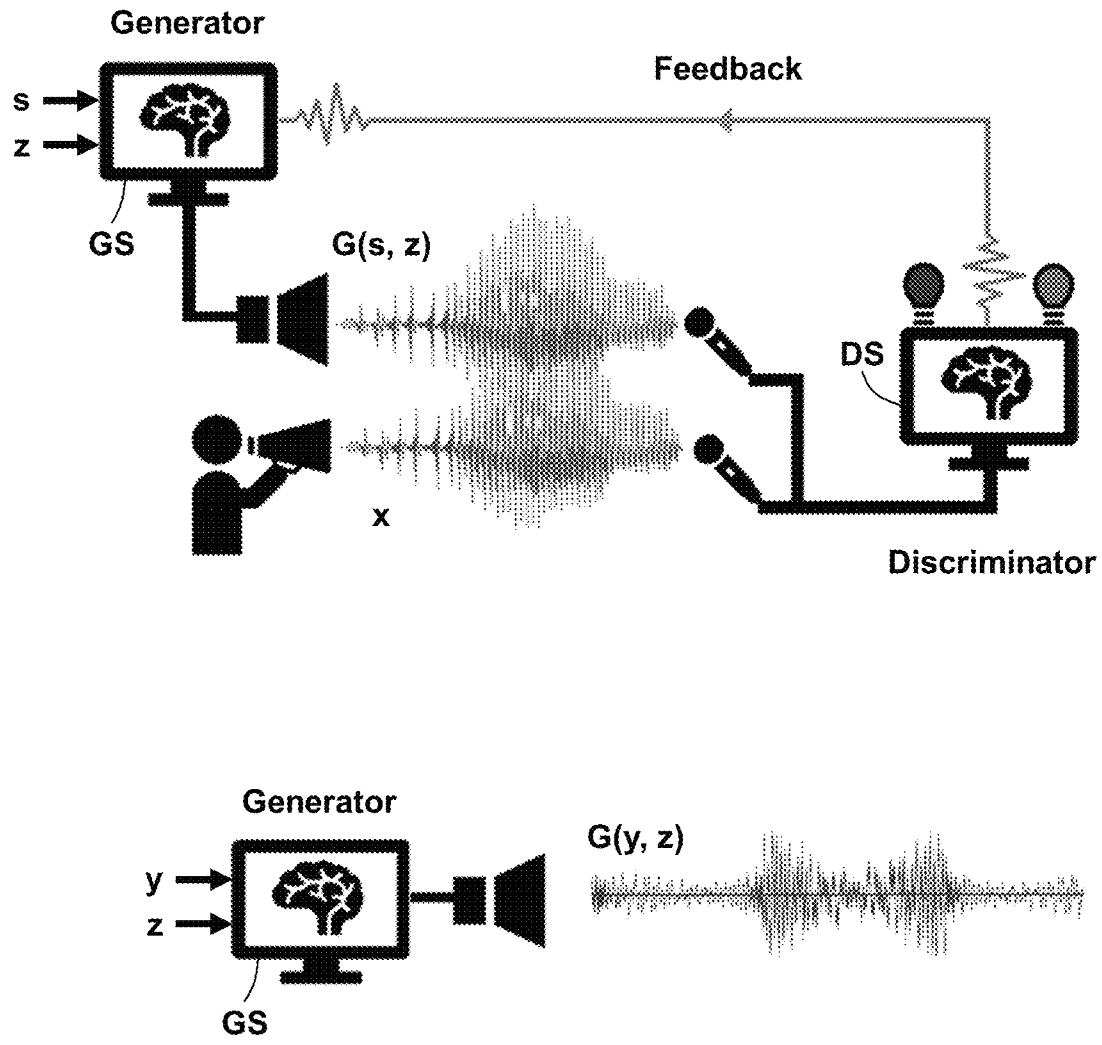
FIG. 5 is a schematic diagram of a machine learning training according to an embodiment of the disclosure.

FIG. 5 is a schematic diagram of a machine learning training according to an embodiment of the disclosure. Referring to FIG. 5, the mel generative adversarial network is a non-autoregressive convolutional neural network architecture, and uses the generative adversarial network (GAN) to reversely push the mel-frequency spectrum back to the waveform graph, which is faster and smaller than the originally used WaveNet, but still maintains computational efficiency. The mel generative adversarial network includes a discriminator DS and a generator GS. The discriminator DS is a deep neural network consisting of a plurality of convolutional layers and residual blocks. The convolutional layer of the discriminator DS is configured to extract sound features from the audio waveform, while the residual block is configured to improve the ability of the discriminator DS to distinguish between real audio waveforms and synthetic audio waveforms. The generator GS is also a deep neural network consisting of a plurality of convolutional layers and residual blocks. The convolutional layer of the generator GS is configured to extract features from the mel-frequency spectrogram, while the residual block is configured to improve the quality of the synthesized audio waveform.

By inputting a basic sound signal z and a mel-frequency cepstrum coefficient s to the generator GS, an estimated sound signal G(s,z) (e.g., a frequency-shifted sound signal) can be output/generated. The basic sound signal z can be a white noise signal, a brown noise signal, a pink noise signal, or other sound signals. The mel-frequency cepstrum coefficient s is the mel-frequency cepstrum coefficient of a down-converted sound signal x. The down-converted sound signal x is to perform down conversion processing on the training sound signal. For example, in patent TW 1557729, the frequency is reduced to one-quarter or one-half of the sampled speech signal (for example, training sound signal). Alternatively, the frequency of the training sound signal can be reduced through other down conversion algorithms. The training sound signal is a speech signal, for example, a speech signal generated by recording, receiving, or software editing.

On the other hand, in the training of the mel generative adversarial network, by inputting the down-converted sound signal x and the estimated sound signal G(s,z) to the discriminator DS, the discriminator DS can use the down-converted sound signal x to determine the authenticity of the estimated sound signal G(s,z) generated by the generator GS. That is, it is determined whether the estimated sound signal G(s,z) is the down-converted sound signal x. The generator GS and the discriminator DS constantly compete with each other and update the parameters of the generator GS accordingly. The trained generator GS can be configured to input a mel-frequency cepstrum coefficient y and output a frequency-shifted estimated sound signal G(y,z) accordingly. For example, by inputting the plurality of mel-frequency cepstrum coefficients of the sound signal to be processed to the trained generator GS, a synthesized sound signal (i.e., a frequency-shifted sound signal) can be output.

In other embodiments, the synthesized sound signal can be generated by other neural networks, and the neural networks are trained to know the correlation between the mel-frequency cepstrum coefficients and the synthesized sound signal.

In an embodiment, the synthesized sound signal is played by speaker 110. That is, the speaker 110 can play the synthesized sound signal. Alternatively, the processing apparatus 100 can transmit the synthesized sound signal to other devices and play the synthesized sound signal through other devices.

Figure 6:
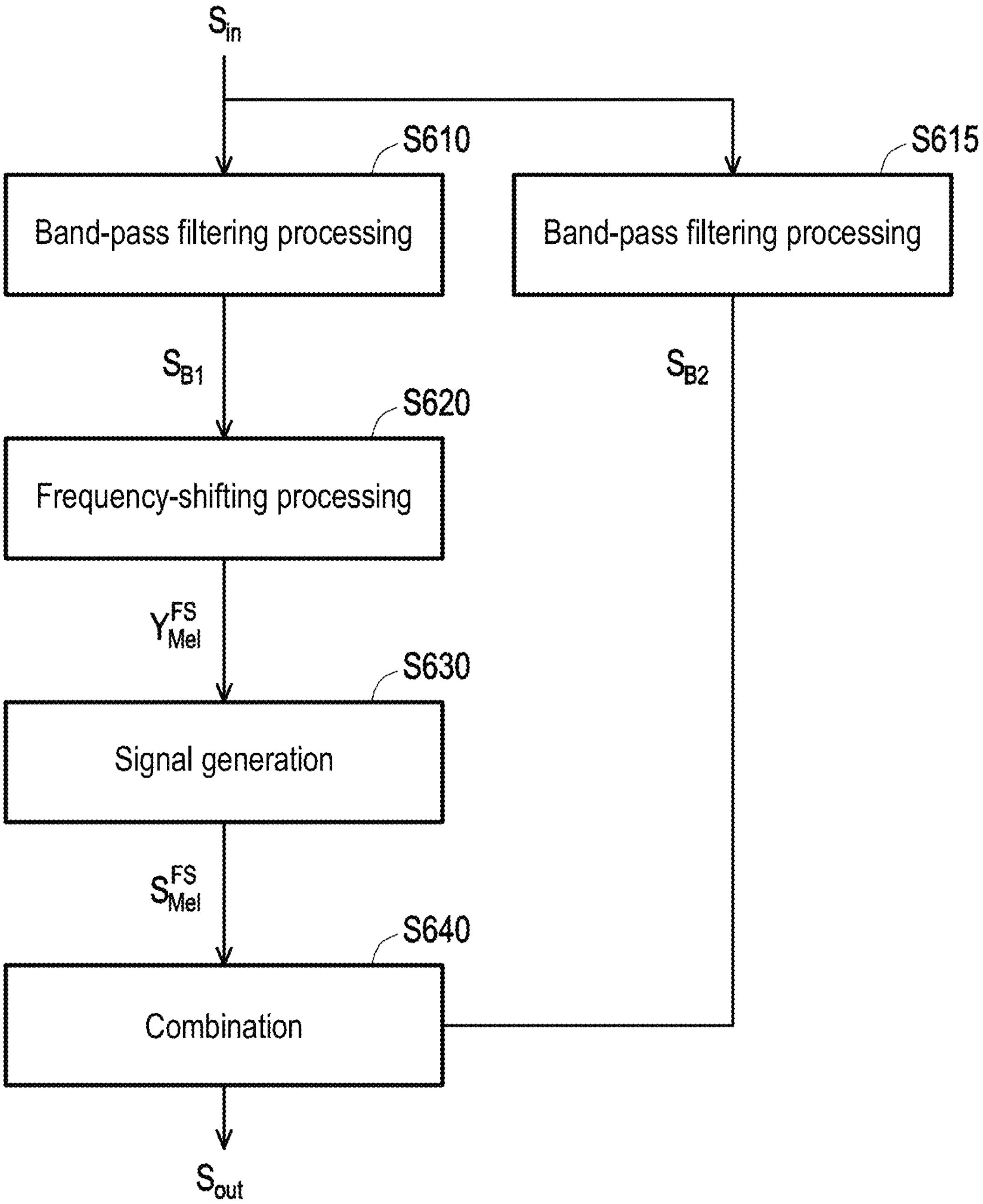
FIG. 6 is a flowchart of a processing method of a sound signal according to an embodiment of the disclosure.

FIG. 6 is a flowchart of a processing method of a sound signal according to an embodiment of the disclosure. Referring to FIG. 6, the processor 130 performs band-pass filtering processing on an initial sound signal Si. (step S610 and step S615) to output the sound signal to be processed $S_{B1}$ and a bypass sound signal $S_{B2}$. The initial sound signal $S_{in}$ may be a speech signal generated by recording, receiving, or editing. Step S610 and step S615 respectively correspond to different frequency bands. The sound signal to be processed $S_{B1}$ corresponds to a first frequency band, such as 4 kHz to 8 kHz corresponding to breath sounds in speech, but is not limited thereto. The bypass sound signal $S_{B2}$ corresponds to a second frequency band, which does not, for example correspond to breath sounds which are less than or equal to 4 kHz, but is not limited thereto. The first frequency band is different from the second frequency band.

The processor 130 performs frequency-shifting processing on the sound signal to be processed $S_{B1}$, and generates the mel-frequency cepstrum coefficients $$Y_{Mel}^{FS}$$

corresponding to the frequency-shifted sound signal to be processed $S_{B1}$ (step S620). For detailed description of step S620, reference may be made to the foregoing description of step S210, which are not repeated here.

The processor 130 generates the synthesized sound signal $$S_{Mel}^{FS}$$

based on the mel-frequency cepstrum coefficients $$Y_{Mel}^{FS}$$

(step S630). For detailed description of step S630, reference may be made to the foregoing description of step S220, which are not repeated here.

The processor 130 combines the synthesized sound signal $$S_{Mel}^{FS}$$

and the bypass sound signal $S_{B2}$ into an output sound signal $S_{out}$ (step S640). For example, two sound signals are superimposed in the frequency domain or time domain. The output sound signal $S_{out}$ is configured to be played by the speaker. That is, the speaker 110 can play the output sound signal $S_{out}$. Alternatively, the processing apparatus 100 can transmit the output sound signal $S_{out}$ to other devices and play the output sound signal $S_{out}$ through other devices.

In an application scenario, the sound signal to be processed played in a video conference, call, or dialogue can be transformed into the output sound signal $S_{out}$, so that the hearing-impaired person can distinguish the complete meaning, and can still be able to understand the meaning despite hearing the breath sounds in the speech.

To sum up, in the processing method and the processing apparatus of the sound signal according to the embodiment of the disclosure, in the process of extracting the mel-frequency cepstrum coefficients, the power of the mel-frequency spectrum is frequency-shifted, and the synthetic sound signal can be generated according to the frequency-shifted mel-frequency cepstrum coefficients. Other frequency shift algorithms may stretch the sound signal during the process, but in the end only the length before stretching will be retained and some features will be ignored. However, the embodiment of the disclosure can retain the complete sound feature and can also achieve the effect of frequency shift.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A processing method of a sound signal, comprising:

extracting a plurality of mel-frequency cepstrum coefficients (MFCCs) from a sound signal to be processed, comprising:

obtaining a power corresponding to a plurality of mel-frequencies of the sound signal to be processed through a plurality of band-pass filters, wherein each of the band-pass filters corresponds to the mel-frequency in units of a mel scale, and the mel-frequencies corresponding to the band-pass filters are different;

mapping a first frequency among the mel-frequencies to a second frequency among the mel-frequencies, and replacing the power corresponding to the second frequency with the power corresponding to the first frequency to generate frequency-shifted mel-frequencies, wherein the second frequency is lower than the first frequency, the power corresponding to the second frequency of the frequency-shifted mel-frequencies is the power corresponding to the first frequency of the mel-frequencies, and mapping the first frequency among the mel-frequencies to the second frequency among the mel-frequencies comprises:

shifting the first frequency to the second frequency according to a displacement amount, wherein a unit of the displacement amount corresponds to the mel scale; and shifting a third frequency among the mel-frequencies to a fourth frequency among the mel-frequencies according to the displacement amount, wherein the fourth frequency is lower than the third frequency; and generating the mel-frequency cepstrum coefficients using the power corresponding to the frequency-shifted mel-frequencies, comprising:

performing an energy spectrum transform on the powers of the frequency-shifted mel frequencies using weights of the bandpass filters to generate powers of the frequency-shifted mel frequencies on energy spectrum of the mel-scale;

taking a logarithm of the power at each of the frequency-shifted mel frequencies in the energy spectrum of the mel-scale to obtain log energy of the frequency-shifted mel frequencies; and bringing the log energy of the frequency-shifted mel frequencies into a discrete cosine transform (DCT) to obtain the mel-frequency cepstral coefficients of the mel-scale; and generating a synthesized sound signal using the mel-frequency cepstrum coefficients of the sound signal to be processed, wherein the sound signal to be processed and the synthesized sound signal are played by a speaker.

2. The processing method of the sound signal according to claim 1, wherein the first frequency is located in a target frequency band, and the processing method further comprises:

remaining a power corresponding to a fifth frequency less than or more than the target frequency band unchanged.

3. The processing method of the sound signal according to claim 1, wherein before the step of obtaining the mel-frequency cepstrum coefficients of the sound signal to be processed, the step further comprises:

performing a band-pass filtering processing on an initial sound signal to output the sound signal to be processed and a bypass sound signal, wherein the sound signal to be processed corresponds to a first frequency band, the bypass sound signal corresponds to a second frequency band, and the first frequency band is different from the second frequency band.

4. The processing method of the sound signal according to claim 3, wherein after the step of generating the synthesized sound signal using the mel-frequency cepstrum coefficients of the sound signal to be processed, the step further comprises:

combining the synthesized sound signal and the bypass sound signal into an output sound signal, wherein the output sound signal is configured to be played by the speaker.

5. The processing method of the sound signal according to claim 3, wherein the first frequency band is 4 kHz to 8 kHz.

6. The processing method of the sound signal according to claim 1, wherein the step of generating the synthesized sound signal using the mel-frequency cepstrum coefficients of the sound signal to be processed comprises:

outputting the synthesized sound signal by inputting the mel-frequency cepstrum coefficients of the sound signal to be processed to a mel generative adversarial network (MelGAN), wherein in a training of the mel generative adversarial network, a discriminator uses a down-converted sound signal to determine an authenticity of an estimated sound signal generated by a generator, and the down-converted sound signal is to perform a down conversion processing on a training sound signal.

7. A processing apparatus of a sound signal, comprising:

a storage, configured to store a program code; and a processor, coupled to the storage, and configured to load the program code to:

obtain a plurality of mel-frequency cepstrum coefficients of a sound signal to be processed, wherein the processor is configured to:

obtain a power corresponding to a plurality of mel-frequencies of the sound signal to be processed through a plurality of band-pass filters, wherein each of the band-pass filters corresponds to the mel-frequency in units of a mel scale, and the mel-frequencies corresponding to the band-pass filters are different;

map a first frequency among the mel-frequencies to a second frequency among the mel-frequencies, and replace the power corresponding to the second frequency with the power corresponding to the first frequency to generate frequency-shifted mel-frequencies, wherein the second frequency is lower than the first frequency, the power corresponding to the second frequency of the frequency-shifted mel-frequencies is the power corresponding to the first frequency of the mel-frequencies, and mapping the first frequency among the mel-frequencies to the second frequency among the mel-frequencies comprises:

shifting the first frequency to the second frequency according to a displacement amount, wherein a unit of the displacement amount corresponds to the mel scale; and shifting a third frequency among the mel-frequencies to a fourth frequency among the mel-frequencies according to the displacement amount, wherein the fourth frequency is lower than the third frequency; and generate the mel-frequency cepstrum coefficients using the power corresponding to the frequency-shifted mel-frequencies, comprising:

performing an energy spectrum transform on the powers of the frequency-shifted mel frequencies using weights of the bandpass filters to generate powers of the frequency-shifted mel frequencies on energy spectrum of the mel-scale;

taking a logarithm of the power at each of the frequency-shifted mel frequencies in the energy spectrum of the mel-scale to obtain log energy of the frequency-shifted mel frequencies; and bringing the log energy of the frequency-shifted mel frequencies into a discrete cosine transform (DCT) to obtain the mel-frequency cepstral coefficients of the mel-scale; and generate a synthesized sound signal using the mel-frequency cepstrum coefficients of the sound signal to be processed, wherein the sound signal to be processed and the synthesized sound signal are configured to be played by a speaker.

8. The processing apparatus of the sound signal according to claim 7, wherein the processor is further configured to:

remain a power corresponding to a fifth frequency less than or more than the target frequency band unchanged.

9. The processing apparatus of the sound signal according to claim 7, wherein the processor is further configured to:

perform a band-pass filtering processing on an initial sound signal to output the sound signal to be processed and a bypass sound signal, the sound signal to be processed corresponds to a first frequency band, the bypass sound signal corresponds to a second frequency band, and the first frequency band is different from the second frequency band.

10. The processing apparatus of the sound signal according to claim 9, wherein the processor is further configured to:

combine the synthesized sound signal and the bypass sound signal into an output sound signal, wherein the output sound signal is configured to be played by the speaker.

11. The processing apparatus of the sound signal according to claim 9, wherein the first frequency band is 4 kHz to 8 kHz.

12. The processing apparatus of the sound signal according to claim 7, wherein the processor is further configured to:

output the synthesized sound signal by inputting the mel-frequency cepstrum coefficients of the sound signal to be processed to a mel generative adversarial network, wherein in a training of the mel generative adversarial network, a discriminator uses a down-converted sound signal to determine an authenticity of an estimated sound signal generated by a generator, and the down-converted sound signal is to perform a down conversion processing on a training sound signal.

* * * * *